United States Patent
Brodkin

(10) Patent No.: US 10,248,205 B2
(45) Date of Patent: Apr. 2, 2019

(54) APPARATUS FOR RECORDING AUDIO AND VIBRATION CONTENT OF EVENT

(71) Applicant: Nokia Technologies Oy, Espoo (FI)

(72) Inventor: Panu Petri Brodkin, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/780,675

(22) PCT Filed: Apr. 2, 2013

(86) PCT No.: PCT/IB2013/052617
§ 371 (c)(1),
(2) Date: Sep. 28, 2015

(87) PCT Pub. No.: WO2014/162170
PCT Pub. Date: Oct. 9, 2014

(65) Prior Publication Data
US 2016/0048208 A1    Feb. 18, 2016

(51) Int. Cl.
*G06F 3/01* (2006.01)
*G06F 1/16* (2006.01)
(Continued)

(52) U.S. Cl.
CPC ............ *G06F 3/016* (2013.01); *G06F 1/1694* (2013.01); *G06F 3/03547* (2013.01); *G06F 3/043* (2013.01); *G06F 3/0412* (2013.01); *G06F 3/0416* (2013.01); *G08B 3/10* (2013.01); *G06F 2203/04106* (2013.01)

(58) Field of Classification Search
CPC ...... G06F 3/016; G06F 3/0412; G06F 3/0416; G06F 1/1694; G06F 3/043; G06F 3/03547; G06F 2203/04106; G08B 3/10; B06B 1/045; H04R 3/005; H04R 7/24; A61B 5/0006

See application file for complete search history.

(56) References Cited

U.S. PATENT DOCUMENTS 7,911,328 B2    3/2011   Luden et al.
8,712,069 B1 *  4/2014   Murgia .................. H04R 3/005
                                                     381/71.1

(Continued)

FOREIGN PATENT DOCUMENTS

WO    2000/063874 A1    10/2000

OTHER PUBLICATIONS

Danieau et al., "Framework for Enhancing Video Viewing Experience With Haptic Effects of Motion", IEEE Haptics Symposium, Mar. 4-7, 2012, pp. 541-546.

(Continued)

*Primary Examiner* — Richard J Hong
(74) *Attorney, Agent, or Firm* — Harrington & Smith

(57) ABSTRACT

An apparatus comprising: at least one first input configured to receive at least one first sensor signal, the at least one first sensor signal having a first modality; at least one second input configured to receive at least one second sensor signal, the at least one second sensor signal having a second modality different from the first modality; and a codec configured to generate at least one meta signal comprising and stored using separate resources the at least one first sensor signal and the at least one second sensor signal.

21 Claims, 8 Drawing Sheets

(51) Int. Cl.
*G06F 3/041* (2006.01)
*G08B 3/10* (2006.01)
*G06F 3/043* (2006.01)
*G06F 3/0354* (2013.01)

(56) References Cited

U.S. PATENT DOCUMENTS

| | | | |
|---|---|---|---|
| 2005/0047621 A1* | 3/2005 | Cranfill | B06B 1/045 381/334 |
| 2005/0062841 A1 | 3/2005 | Rivera-Cintron | |
| 2005/0070241 A1 | 3/2005 | Northcutt et al. | |
| 2007/0097073 A1 | 5/2007 | Takashima et al. | |
| 2008/0223627 A1 | 9/2008 | Lacroix et al. | |
| 2009/0231276 A1* | 9/2009 | Ullrich | G06F 3/016 345/157 |
| 2010/0013613 A1* | 1/2010 | Weston | G06F 3/016 340/407.2 |
| 2010/0141408 A1 | 6/2010 | Doy et al. | |
| 2010/0260371 A1* | 10/2010 | Afshar | H04R 7/24 381/394 |
| 2011/0125063 A1* | 5/2011 | Shalon | A61B 5/0006 600/590 |
| 2011/0234384 A1 | 9/2011 | Agrawal | |
| 2012/0026114 A1 | 2/2012 | Sup | |
| 2012/0062491 A1 | 3/2012 | Coni et al. | |
| 2012/0121097 A1 | 5/2012 | Dreifus et al. | |
| 2018/0120892 A1* | 5/2018 | von Badinski | G06F 3/1423 |

OTHER PUBLICATIONS

Kuchenbecker, "Real Objects to Enable Authentic Haptic Rendering", Springer Tracts in Advanced Robotics, vol. 70, Feb. 11-14, 2008, 3 pages.

Wilson et al., "Integration of Auditory and Vibrotactile Stimuli: Effects of Phase and Stimulus-Onset Asynchrony", The Journal of the Acoustical Society of America, vol. 126, No. 4, Oct. 2009, pp. 1960-1974.

Extended European Search Report received for corresponding European Patent Application No. 13881255.7, Nov. 8, 2016, 7 pages.

International Search Report and Written Opinion received for corresponding Patent Cooperation Treaty Application No. PCT/IB2013/052617, dated Feb. 6, 2014, 14 pages.

* cited by examiner

APPARATUS FOR RECORDING AUDIO AND VIBRATION CONTENT OF EVENT

RELATED APPLICATION

This application was originally filed as Patent Cooperation Treaty Application No. PCT/IB2013/052617 filed Apr. 2, 2013.

FIELD

The present invention relates to a providing recordings of sensor signals with differing modalities. The invention further relates to, but is not limited to, apparatus providing recordings of sensor signals with differing modalities for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

Statement

According to an aspect, there is provided a method comprising: receiving at least one first sensor signal, the at least one first sensor signal having a first modality; receiving at least one second sensor signal, the at least one second sensor signal having a second modality different from the first modality; and generating at least one meta signal comprising the at least one first sensor signal and the at least one second sensor signal.

Generating the at least one meta signal may comprise encapsulating the at least one first sensor signal and the at least one second sensor signal as a plurality of channels within the meta signal, the plurality of channels may be assigned such that at least one channel is the at least one first sensor signal and at least one different channel is the at least one second signal is at least one channel.

The method may further comprise at least one of: storing the at least one meta signal in a memory; and transmitting the at least one meta signal to an apparatus.

The method may further comprise processing the at least one first sensor signal/at least one second sensor signal prior to generating the at least one meta signal such that the at least one first sensor signal/at least one second sensor signal has a range of values suitable for the generating the at least one meta signal.

Processing the at least one first sensor signal/at least one second sensor signal may comprise equalising at least one of the at least one first sensor signal and the at least one second sensor signal based on the other of the at least one first sensor signal and the at least one second sensor signal.

The method may further comprise: receiving at least one further sensor signal, the at least one further sensor signal having a modality different from the at least one first sensor signal and the at least one second sensor signal; and wherein generating at least one meta signal comprising the at least one first sensor signal and the at least one second sensor signal may comprise generating the at least one meta signal comprising the at least one first sensor signal, the at least one second sensor signal and the at least one further sensor signal.

One of the at least one sensor signals may comprise at least one audio signal, and receiving the at least one sensor signal may comprise receiving the at least one audio signal from at least one of: at least one microphone; at least one memory; and at least one remote apparatus.

One of the at least one sensor signals may comprise at least one touch sensor signal, and receiving the at least one sensor signal may comprise receiving the at least one touch sensor signal from at least one of: at least one touch sensor associated with an apparatus display; at least one memory; and at least one remote apparatus.

One of the at least one sensor signals may comprise at least one accelerometer signal, and receiving the at least one sensor signal may comprise receiving the at least one accelerometer signal from at least one of: at least one accelerometer associated with an apparatus; at least one memory; and at least one remote apparatus.

The at least one second sensor signal having a second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

The method may further comprise storing the meta-signal the at least one first sensor signal and the at least one second sensor signal with separate resources.

The separate resources may be at least one of: channels; frequency; and time periods.

According to a second aspect there is provided a method comprising: receiving at least one meta signal comprising: at least one first sensor signal and at least one second sensor signal, the at least one first sensor signal and the at least one second sensor signal stored within the at least one meta signal; and separating the at least one meta signal to generate the at least one first sensor signal and the at least one second sensor signal.

Receiving the at least one meta signal may comprise at least one of: receiving the at least one meta signal from a memory; and receiving the at least one meta signal from a further apparatus.

The method may further comprise processing at least one of the sensor signals to restore the sensor signal to an original range.

One of the at least one sensor signals may comprise at least one audio signal, the method may further comprise outputting the at least one audio signal to at least one of: at least one audio transducer; at least one memory; and at least one remote apparatus.

One of the at least one sensor signals may comprise at least one touch sensor signal, and the method may further comprise outputting the at least one touch sensor signal to at least one of: at least one tactile effect transducer associated with an apparatus display; at least one memory; and at least one remote apparatus.

One of the at least one sensor signals may comprise at least one accelerometer signal, and the method may further comprise outputting the at least one accelerometer signal to at least one of; at least one vibra associated with an apparatus; at least one memory; and at least one remote apparatus.

The method may further comprise separating the at least one meta signal by separating the separate resources to generate the at least one first sensor signal and the at least one second sensor signal.

The separate resources may be at least one of: channels; frequency; and time periods.

The at least one first sensor signal may originate from a first sensor having a first modality and the at least one second sensor signal may originate from a second sensor having a second modality different from the first modality, wherein the second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

According to a third aspect there is provided an apparatus comprising at least one processor and at least one memory including computer code for one or more programs, the at least one memory and the computer code configured to with the at least one processor cause the apparatus to at least: receive at least one first sensor signal, the at least one first sensor signal having a first modality; receive at least one second sensor signal, the at least one second sensor signal having a second modality different from the first modality; and generate at least one meta signal comprising the at least one first sensor signal and the at least one second sensor signal.

Generating the at least one meta signal may cause the apparatus to encapsulate the at least one first sensor signal and the at least one second sensor signal as a plurality of channels within the meta signal, the plurality of channels may be assigned such that at least one channel is the at least one first sensor signal and at least one different channel is the at least one second signal is at least one channel.

The apparatus may be caused to further perform at least one of: store the at least one meta signal in a memory; and transmit the at least one meta signal to an apparatus.

The apparatus may be caused to further process the at least one first sensor signal/at least one second sensor signal prior to generating the at least one meta signal such that the at least one first sensor signal/at least one second sensor signal has a range of values suitable for the generating the at least one meta signal, Processing the at least one first sensor signal/at least one second sensor signal may cause the apparatus to equalise at least one of the at least one first sensor signal and the at least one second sensor signal based on the other of the at least one first sensor signal and the at least one second sensor signal.

The apparatus may be further caused to: receive at least one further sensor signal, the at least one further sensor signal having a modality different from the at least one first sensor signal and the at least one second sensor signal; and wherein generating at least one meta signal comprising the at least one first sensor signal and the at least one second sensor signal may cause the apparatus to generate the at least one meta signal comprising the at least one first sensor signal, the at least one second sensor signal and the at least one further sensor signal.

One of the at least one sensor signals may comprise at least one audio signal, and receiving the at least one sensor signal may cause the apparatus to receive the at least one audio signal from at least one of: at least one microphone; at least one memory; and at least one remote apparatus.

One of the at least one sensor signals may comprise at least one touch sensor signal, and receiving the at least one sensor signal may cause the apparatus to receive the at least one touch sensor signal from at least one of: at least one touch sensor associated with an apparatus display; at least one memory; and at least one remote apparatus.

One of the at least one sensor signals may comprise at least one accelerometer signal, and receiving the at least one sensor signal may cause the apparatus to receive the at least one accelerometer signal from at least one of: at least one accelerometer associated with an apparatus; at least one memory; and at least one remote apparatus.

The at least one second sensor signal having a second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

The apparatus may be further caused to store the meta-signal the at least one first sensor signal and the at least one second sensor signal with separate resources, The separate resources may be at least one of: channels; frequency; and time periods, According to a fourth aspect there is provided an apparatus comprising at least one processor and at least one memory including computer code for one or more programs, the at least one memory and the computer code configured to with the at least one processor cause the apparatus to at least: receive at least one meta signal comprising: at least one first sensor signal and at least one second sensor signal, the at least one first sensor signal and the at least one second sensor signal stored within the at least one meta signal; and separate the at least one meta signal to generate the at least one first sensor signal and the at least one second sensor signal, Receiving the at least one meta signal may cause the apparatus to perform at least one of: receive the at least one meta signal from a memory; and receive the at least one meta signal from a further apparatus.

The apparatus may be further caused to process at least one of the sensor signals to restore the sensor signal to an original range.

One of the at least one sensor signals may comprise at least one audio signal, the apparatus may further be caused to output the at least one audio signal to at least one of: at least one audio transducer; at least one memory; and at least one remote apparatus.

One of the at least one sensor signals may comprise at least one touch sensor signal, and the apparatus may be further caused to output the at least one touch sensor signal to at least one of: at least one tactile effect transducer associated with an apparatus display; at least one memory; and at least one remote apparatus.

One of the at least one sensor signals may comprise at least one accelerometer signal, and the apparatus may be further caused to output the at least one accelerometer signal to at least one of: at least one vibra associated with an apparatus; at least one memory; and at least one remote apparatus.

The apparatus may be further caused to separate the at least one meta signal by separating the separate resources to generate the at least one first sensor signal and the at least one second sensor signal.

The separate resources may be at least one of: channels; frequency; and time periods.

The at least one first sensor signal may originate from a first sensor having a first modality and the at least one second sensor signal may originate from a second sensor having a second modality different from the first modality, wherein the second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

According to a fifth aspect there is provided an apparatus comprising: means for receiving at least one first sensor signal, the at least one first sensor signal having a first modality; means for receiving at least one second sensor signal, the at least one second sensor signal having a second modality different from the first modality; and means for generating at least one meta signal comprising the at least one first sensor signal and the at least one second sensor signal.

The means for generating the at least one meta signal may comprise means for encapsulating the at least one first sensor signal and the at least one second sensor signal as a plurality of channels within the meta signal, the plurality of channels may be assigned such that at least one channel is the at least one first sensor signal and at least one different channel is the at least one second signal is at least one channel.

The apparatus may further comprise at least one of: means for storing the at least one meta signal in a memory; and means for transmitting the at least one meta signal to an apparatus.

The apparatus may further comprise means for processing the at least one first sensor signal/at least one second sensor signal prior to generating the at least one meta signal such that the at least one first sensor signal/at least one second sensor signal has a range of values suitable for the generating the at least one meta signal.

The means for processing the at least one first sensor signal/at least one second sensor signal may comprise means for equalising at least one of the at least one first sensor signal and the at least one second sensor signal based on the other of the at least one first sensor signal and the at least one second sensor signal.

The apparatus may further comprise: means for receiving at least one further sensor signal, the at least one further sensor signal having a modality different from the at least one first sensor signal and the at least one second sensor signal; and wherein the means for generating at least one meta signal comprising the at least one first sensor signal and the at least one second sensor signal may comprise means for generating the at least one meta signal comprising the at least one first sensor signal, the at least one second sensor signal and the at least one further sensor signal.

One of the at least one sensor signals may comprise at least one audio signal, and the means for receiving the at least one sensor signal may comprise means for receiving the at least one audio signal from at least one of: at least one microphone; at least one memory; and at least one remote apparatus.

One of the at least one sensor signals may comprise at least one touch sensor signal, and the means for receiving the at least one sensor signal may comprise means for receiving the at least one touch sensor signal from at least one of: at least one touch sensor associated with an apparatus display; at least one memory; and at least one remote apparatus.

One of the at least one sensor signals may comprise at least one accelerometer signal, and the means for receiving the at least one sensor signal may comprise means for receiving the at least one accelerometer signal from at least one of: at least one accelerometer associated with an apparatus; at least one memory; and at least one remote apparatus.

The at least one second sensor signal having a second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

The apparatus may further comprise means for storing the meta-signal the at least one first sensor signal and the at least one second sensor signal with separate resources.

The separate resources may be at least one of: channels; frequency; and time periods.

According to a sixth aspect there is provided an apparatus comprising: means for receiving at least one meta signal comprising: at least one first sensor signal and at least one second sensor signal, the at least one first sensor signal and the at least one second sensor signal stored within the at least one meta signal; and means for separating the at least one meta signal to generate the at least one first sensor signal and the at least one second sensor signal.

The means for receiving the at least one meta signal may comprise at least one of: means for receiving the at least one meta signal from a memory; and means for receiving the at least one meta signal from a further apparatus.

The apparatus may further comprise means for processing at least one of the sensor signals to restore the sensor signal to an original range.

One of the at least one sensor signals may comprise at least one audio signal, the apparatus may further comprise means for outputting the at least one audio signal to at least one of: at least one audio transducer; at least one memory; and at least one remote apparatus.

One of the at least one sensor signals may comprise at least one touch sensor signal, and the apparatus may further comprise means for outputting the at least one touch sensor signal to at least one of: at least one tactile effect transducer associated with an apparatus display; at least one memory; and at least one remote apparatus.

One of the at least one sensor signals may comprise at least one accelerometer signal, and the apparatus may further comprise means for outputting the at least one accelerometer signal to at least one of: at least one vibra associated with an apparatus; at least one memory; and at least one remote apparatus.

The means for separating may further comprise means for separating the separate resources to generate the at least one first sensor signal and the at least one second sensor signal.

The separate resources may be at least one of: channels; frequency; and time periods.

The at least one first sensor signal may originate from a first sensor having a first modality and the at least one second sensor signal may originate from a second sensor having a second modality different from the first modality, wherein the second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

According to a seventh aspect there is provided an apparatus comprising: at least one first input configured to receive at least one first sensor signal, the at least one first sensor signal having a first modality; at least one second input configured to receive at least one second sensor signal, the at least one second sensor signal having a second modality different from the first modality; and a codec configured to generate at least one meta signal comprising the at least one first sensor signal and the at least one second sensor signal.

The codec may be configured to encapsulate the at least one first sensor signal and the at least one second sensor signal as a plurality of channels within the meta signal, the plurality of channels may be assigned such that at least one channel is the at least one first sensor signal and at least one different channel is the at least one second signal is at least one channel.

The apparatus may further comprise at least one of: a memory configured to store the at least one meta signal; and a transmitter configured to transmit the at least one meta signal to a further apparatus.

The apparatus may further comprise a processor configured to further process the at least one first sensor signal/at least one second sensor signal prior to generating the at least one meta signal such that the at least one first sensor signal/at least one second sensor signal has a range of values suitable for the generating the at least one meta signal.

The processor may be configured to equalise at least one of the at least one first sensor signal and the at least one second sensor signal based on the other of the at least one first sensor signal and the at least one second sensor signal.

The apparatus may further comprise: a further input configured to receive at least one further sensor signal, the at least one further sensor signal having a modality different from the at least one first sensor signal and the at least one second sensor signal; and wherein the codec is configured to generate the at least one meta signal comprising the at least one first sensor signal, the at least one second sensor signal and the at least one further sensor signal.

One of the at least one sensor signals may comprise at least one audio signal, and one of the inputs may be configured to receive the at least one audio signal from at least one of: at least one microphone; at least one memory; and at least one remote apparatus.

One of the at least one sensor signals may comprise at least one touch sensor signal, and one of the inputs may be configured to receive the at least one touch sensor signal from at least one of: at least one touch sensor associated with an apparatus display; at least one memory; and at least one remote apparatus.

One of the at least one sensor signals may comprise at least one accelerometer signal, and one of the inputs may be configured to receive the at least one accelerometer signal from at least one of: at least one accelerometer associated with an apparatus; at least one memory; and at least one remote apparatus.

The at least one second sensor signal having a second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input.

The codec may be configured to store the meta-signal the at least one first sensor signal and the at least one second sensor signal with separate resources.

The separate resources may be at least one of: channels; frequency; and time periods.

According to an eighth aspect there is provided an apparatus comprising: an input configured to receive at least one meta signal comprising: at least one first sensor signal and at least one second sensor signal, the at least one first sensor signal and the at least one second sensor signal stored within the at least one meta signal; and a decoder configured to separate the at least one meta signal to generate the at least one first sensor signal and the at least one second sensor signal.

The input may be configured to receive the at least one meta signal from a memory.

The input may be configured to receive the at least one meta signal from a further apparatus.

The apparatus may further comprise a processor configured to process at least one of the sensor signals to restore the sensor signal to an original range.

One of the at least one sensor signals may comprise at least one audio signal, the apparatus may further comprise an output configured to output the at least one audio signal to at least one of: at least one audio transducer; at least one memory; and at least one remote apparatus.

One of the at least one sensor signals may comprise at least one touch sensor signal, and the apparatus may further comprise an output configured to output the at least one touch sensor signal to at least one of: at least one tactile effect transducer associated with an apparatus display; at least one memory; and at least one remote apparatus.

One of the at least one sensor signals may comprise at least one accelerometer signal, and the apparatus may further comprise an output configured to output the at least one accelerometer signal to at least one of: at least one vibra associated with an apparatus; at least one memory; and at least one remote apparatus.

The decoder may further be configured to separate the at least one meta signal by separating the separate resources to generate the at least one first sensor signal and the at least one second sensor signal.

The separate resources may be at least one of: channels; frequency; and time periods.

The at least one first sensor signal may originate from a first sensor having a first modality and the at least one second sensor signal may originate from a second sensor having a second modality different from the first modality, wherein the second modality different from the first modality may comprise at least one of: the first sensor being a first type of sensor and the second sensor being a second type of sensor; the first sensor having a first frequency response to an input and the second sensor having a second different frequency response to the input; the first sensor having a first amplitude response to an input and the second sensor having a second different amplitude response to the input; the first sensor having a first directional sensitivity to an input and the second sensor having a second different directional sensitivity to the input; and the first sensor having a first response to an input and the second sensor having a second different response to the input A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs from a touch screen device.

The concept as described herein in further detail is to employ separate sensors or sensors with different modality to record both the audible and vibrational content of some event. These two or more different modalities can be expressed by the sensors being of differing types for example vibrational and acoustic sensor signals, or being similar types of sensors with different sensitivity or response characteristics (for example a first acoustical sensor with a first frequency response and a second acoustical sensor with a different frequency response or a first acoustical sensor with a first amplitude response for low amplitude acoustical inputs and a second sensor with a second amplitude response for high amplitude acoustical inputs). In such embodiments the sensor signals are kept and stored separately in order to be able later to reproduce these as different modalities (in other words not to mix unintentionally acoustic and vibrational signals, or signals from different configured sensors).

In some embodiments these signals can be encapsulated into one common container, for example a .wav file. The signal format and container can in some embodiments be the same for the other modes such as the vibrational part as is used today with audio signals. (This is because the frequency and dynamic range of the vibro-tactile portion is similar to and overlapping with the acoustical portion.)

It would be understood that this encapsulated vibro-tactile and acoustical signal can be of single event, such as used in association with a UI event, or a longer recording, such as used in association with concert recordings (in other words an acoustic recording where low frequency vibrations or felt vibrations can be captured and later reproduced).

In some embodiments the shorter recordings of single events can then be implemented or associated with various UI events, such as button presses, The playback of the vibro-tactile or acoustical signals can be localized or non-localized depending on the playback capabilities available and may in some embodiments controlled using a control panel setting.

Figure 1:
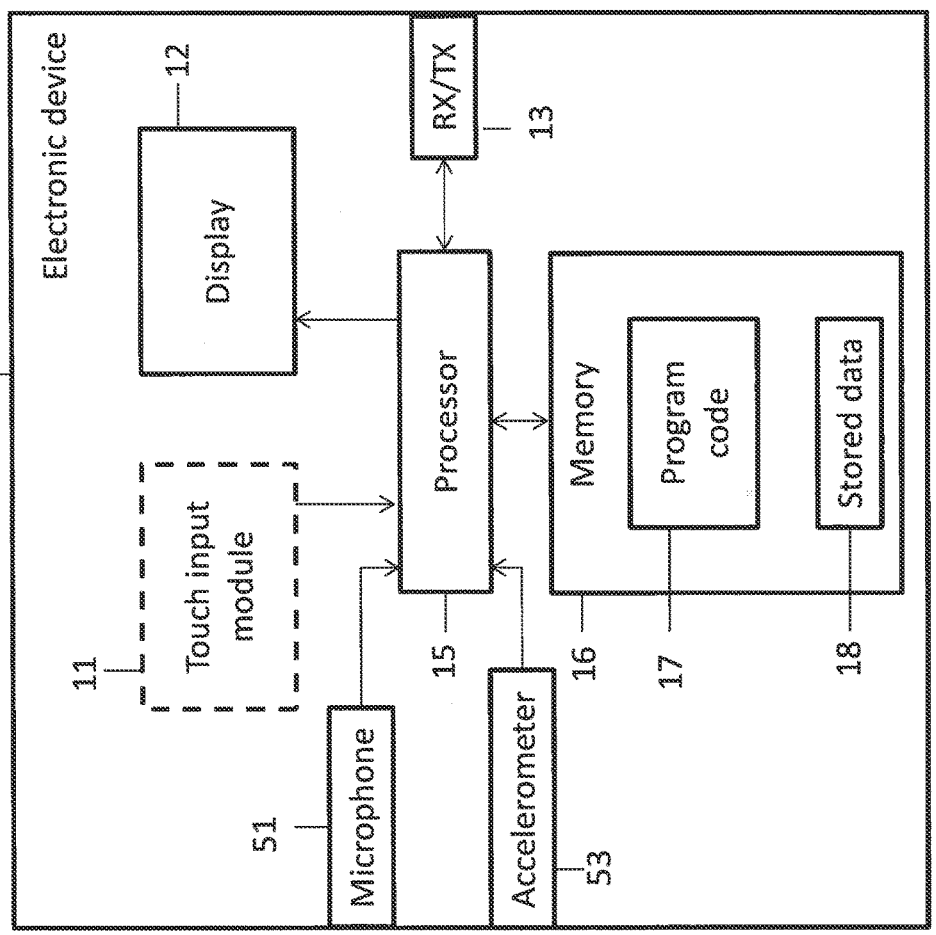
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched.

The processor 15 can in some embodiments be configured to execute various program codes. The implemented program codes, in some embodiments can comprise such routines as touch processing, or tactile effect recording or capture code, signal processing and signal encoding where the touch input and audio signals are captured or recorded. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example the processed and encoded data that has been processed in accordance with the application, for example combined audio-vibrational signal data.

The apparatus 10 can in some embodiments be capable of implementing the processing techniques at least partially in hardware, in other words the processing carried out by the processor 15 may be implemented at least partially in hardware without the need of software or firmware to operate the hardware.

In some embodiments the apparatus comprises a transceiver. The transceiver 13 in some embodiments enables communication with other apparatus or electronic devices, for example in some embodiments via a wireless communication network.

The apparatus 10 further in some embodiments comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The touch input module 11 can be in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electrophoretic displays (also known as electronic paper, e-paper or electronic ink displays).

Figure 2:
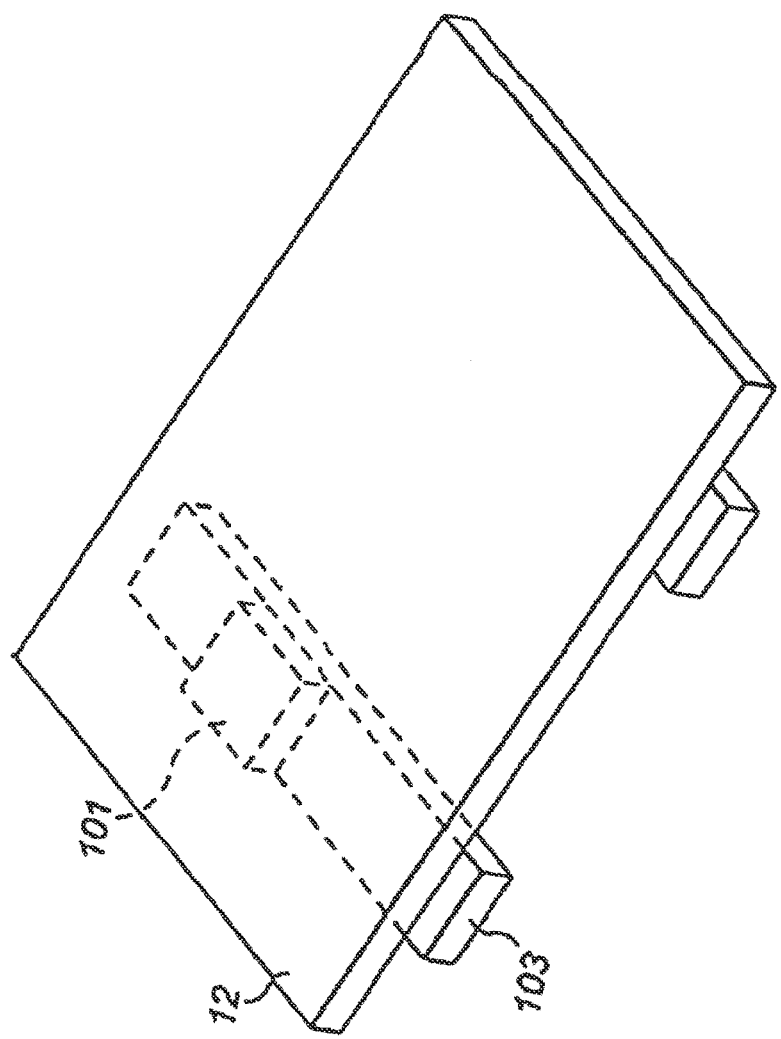
FIG. 2 shows schematically an example tactile audio display with transducer implementation.

An example tactile audio display implementation comprising the display and transducer (or actuator) is shown in FIG. 2. FIG. 2 specifically shows the touch input module 11 and display 12 under which is coupled a pad 101 which can be driven by the transducer 103 located underneath the pad. The motion of the transducer 103 can then be passed through the pad 101 to the display 12 which can then be felt by the user. The transducer or actuator 103 can in some embodiments be a piezo or piezo electric transducer configured to generate a force, such as a bending force when a current is passed through the transducer. This bending force is thus transferred via the pad 101 to the display 12. Similarly the motion of the display, by an external force such as a finger touch or a vibration causing the display to move, can then be passed through the pad 101 to a transducer or actuator which can generate an electrical signal based on the motion of the transducer, such as a bending displacement.

In other words the mechanical vibration can in some embodiments be recorded by the coupling the vibrating object or surface to the apparatus top surface (the object generating the vibration is placed on the display when the display is up) or placing the display in direct connection to the vibrating/coupling surface (the apparatus display is placed against object or surface e.g. turning the apparatus over so the display is in contact with a table which is vibrating).

It would be understood that in other embodiments the arrangement, structure or configuration of the tactile audio display component can be any suitable coupling between the transducer (such as a piezo-electric transducer) and the display. In such a way it can be possible with suitable arrangement of transducers and pads and suitable configuration of the transducers and pads and knowledge of modes of resonance of the display to generate an electrical signal or more than one electrical signal which represents a localised displacement on the display area.

In some embodiments the apparatus comprises a microphone or microphone array 51 for (spatial) audio signal capture. In some embodiments the microphone or array of microphones can be a solid state microphone, in other words capable of capturing audio signals and outputting a suitable digital format signal. In some other embodiments the microphone or array of microphones 51 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 51 is a digital microphone array, in other words configured to generate a digital signal output (and thus not requiring an analogue-to-digital converter). The microphone 51 or array of microphones can be configured to capture or record acoustic waves from different locations or orientations. In some embodiments the microphone or microphone array recording or capture location/orientation configuration can be changed, however in some embodiments the microphone or microphone array recording or capture location/orientation configuration is fixed. In some embodiments the microphone or microphone array recording or capture location/orientation configuration is known and output to the processor or pre-configured and stored in memory to be recovered by the processor. The microphone 51 or array of microphones can in some embodiments output the audio captured signal to an analogue-to-digital converter (ADC) or processor. In some embodiments the array of microphones comprises multiple microphones of which at least two of which are represented by a separate audio signal or channel. For example in some embodiments there can be 3 microphones, each of which can generate a separate audio signal or channel. In some embodiments more than one microphone can be used to generate an audio signal or channel by combining or mixing the audio signals generated from the more than one microphone. The combining or mixing in some embodiments can be an unbiased or biased/processed mixing.

In some embodiments the apparatus comprises an accelerometer 53. The accelerometer can be any suitable means for determining the acceleration or change in velocity of the apparatus. For example the accelerometer 53 can comprise a 3 dimensional micro-electro-mechanical system or sensor (MEMS) configured to determine changes in velocity of the apparatus. In some embodiments the accelerometer 53 can be implemented as a gyroscope or series of gyroscopes. In some embodiments the accelerometer is a one dimensional or directional accelerometer, however in some embodiments the accelerometer is a multidimensional or directional (with substantially perpendicular differences) where in the following each substantially perpendicular dimension or directional is represented by a separate channel or audio signal.

It would be understood that in some embodiments the configuration or the location of the accelerometer 53 or vibration sensors relative to the microphones is not critical as mechanical vibrations travel at the speed of sound in solids which is very high. For example the vibrational wavelength in solids is very long compared to acoustic wavelength and thus the speed of sound is in air ~343 m/s whereas in steel it is ~6000 m/s.)

The concept of the embodiments described herein is to implement recording of audio and mechanical signals such as audio, vibrational and tactile inputs in such a way that the components are recorded and stored separately.

Figure 3:
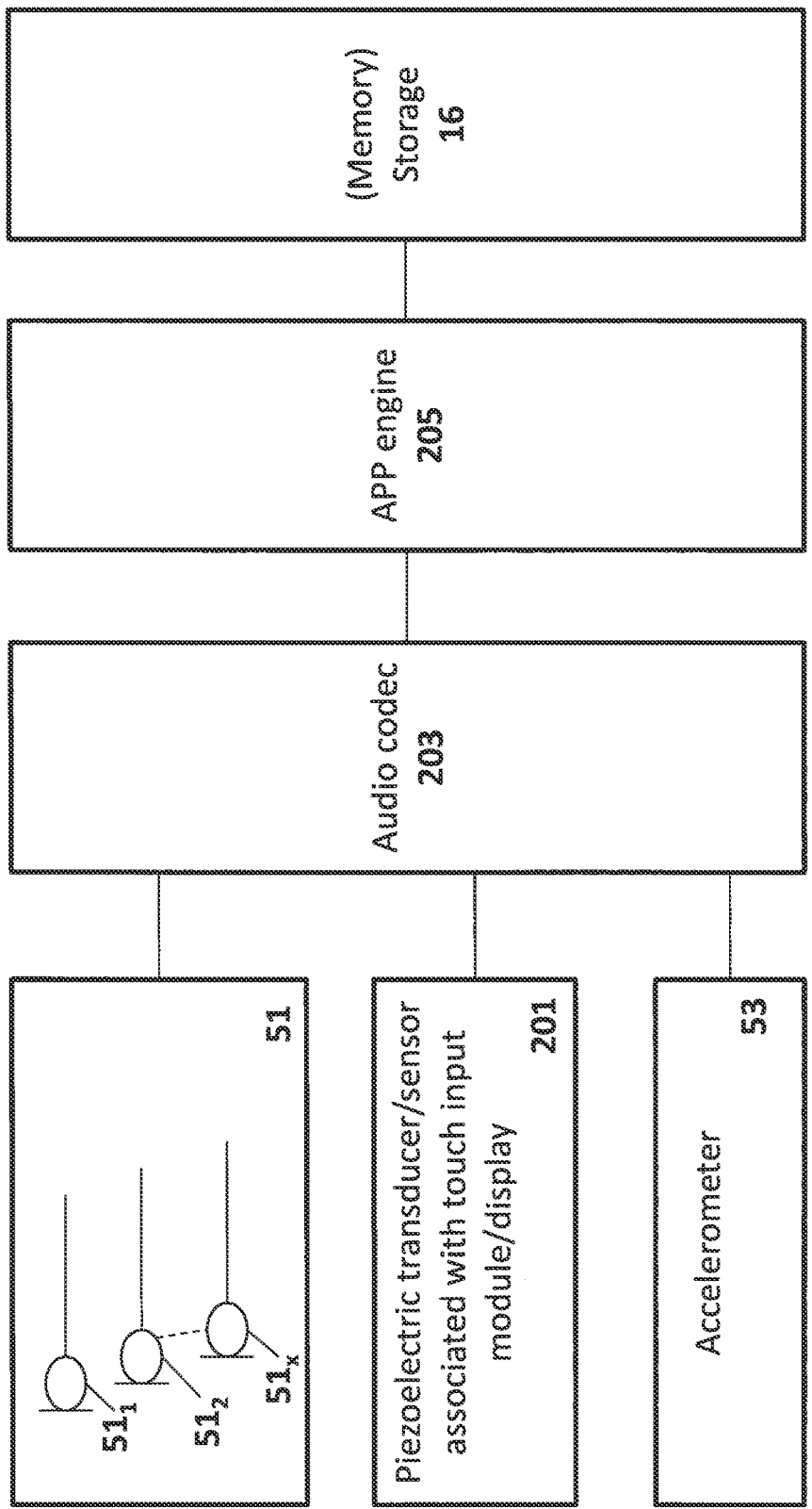
FIG. 3 shows schematically an example tactile effect recording system apparatus according to some embodiments.

With respect to FIG. 3 a suitable tactile effect recording apparatus is described with respect to some embodiments. Furthermore with respect to FIG. 4 a flow diagram showing example operations of the tactile effect recording apparatus as shown in FIG. 3 is shown.

In some embodiments as described herein the apparatus comprises at least one microphone 51 configured to generate audio signals. In the following examples there are X microphones configured to generate X channels of audio signals. In some embodiments the microphone channel audio signals can be output to the audio codec 203. In this example embodiment the at least one microphone represents means for generating at least one sensor signal with a first modality. The modality in this example is with respect to the type of sensor.

Figure 4:
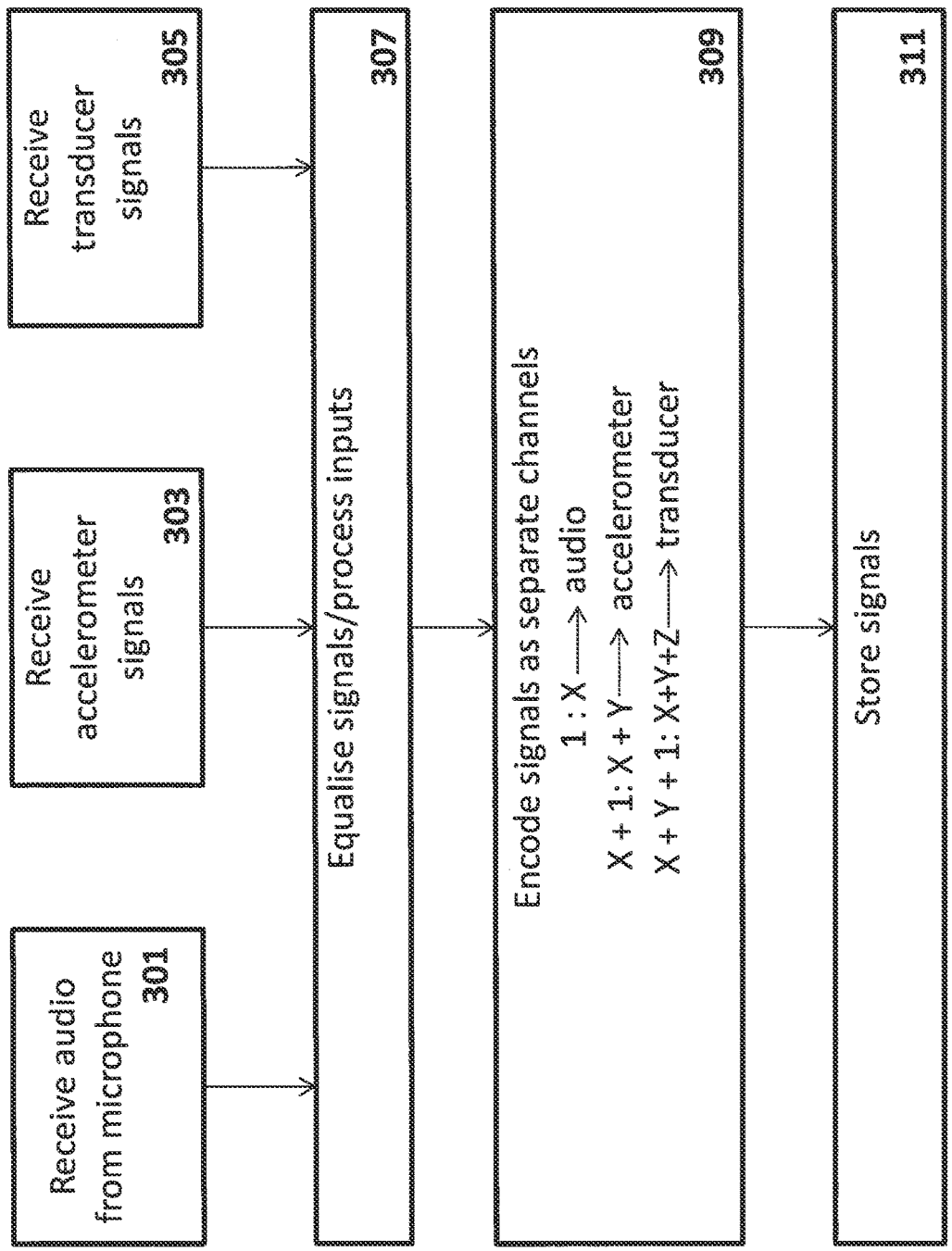
FIG. 4 shows a flow diagram of the operation of the tactile effect recording system apparatus as shown in FIG. 3 according to some embodiments.

The operation of receiving audio signals from the microphones is shown in FIG. 4 by step 301.

In some embodiments the apparatus further comprises at least one piezoelectric transducer/sensor 201. In the following examples there are V piezoelectric transducers configured to generate Y signals. However it would be understood that there can be any number of transducers configured to generate any number of transducer signals. For example in some embodiments the transducer is configured to determine a signal proportional to the movement of the display at a localised area or region of the display and as such an arrangement of transducers can map motion of the display at various areas to signals. In some embodiments the piezoelectric signals can be output to the audio codec 203. In this example embodiment the at least one piezoelectric transducer represents means for generating at least one sensor signal with a second modality. The modality in this example is with respect to the type of sensor which differs from the first modality or mode of operation in that the piezoelectric transducer is a different type of sensor to the microphone. However it would be understood that in some embodiments the modality difference can be reflected in that the output of the two or more sensors is such that the response is different between sensors. For example in some embodiments the first sensor is a microphone which has been modified to detect only vibrations by sealing the microphone membrane in an air tight structure or desynthesizing the microphone membrane and the second sensor is a similar microphone which is not sealed off but coupled to the environment surrounding the apparatus by a suitable acoustical chamber and port. It is understood that the second microphone can be more sensitive to acoustic sounds. As described herein the modality or mode of operation difference between sensors can for example be reflected by the response of the sensor to the input, for example a different frequency response (for wide frequency range recording) or different amplitude response (for wide dynamic range capture or recording), or spatial response (for example a directional microphone and omnidirectional). It is understood that the modality or mode of operation difference between sensors can be reflected by the response of the sensor to a different type of signal.

The operation of receiving piezoelectric transducer signals is shown in FIG. 4 by step 305.

Furthermore in some embodiments the apparatus comprises at least one accelerometer configured to generate accelerometer signals. In the following examples the accelerometers are configured to generate Z signals. In some embodiments the accelerometer signals can be output to the audio codec 203.

The operation of receiving the accelerometer signals is shown in FIG. 4 by step 303.

In some embodiments the apparatus comprises an audio codec 203 (coder-decoder) or suitable means for processing and/or encoding the signals received (which can be any suitable combination of the microphones signals, piezoelectric and accelerometer signals). The audio codec 203 in some embodiments can then be configured to perform processing of the signals from the sources.

In some embodiments the audio codec 203 can be configured to perform an equalisation or processing of the signals to render the inputs into a suitable range of values. In some embodiments the microphone and vibrometer (accelerometer) paths can be equalized to compensate for internal transducer responses and external transfer functions of surrounding acoustics and the vibration coupling path.

However in some embodiments any suitable processing can be performed on the signals by the audio codec 203. The further signal processing algorithms employed can for example be gain directivity, external noise filtering and dynamic range control.

The operation of equalising the signals or processing the inputs is shown in FIG. 4 by step 307.

Furthermore in some embodiments the audio codec 203 can be configured to encode the signals as separate channels. In other words the audio codec 203 in some embodiments can be configured to combine the different types of signal into a single signal with multiple channels. For example in some embodiments the audio codec is configured to generate a multichannel signal or signal stream wherein a channel can be associated with a signal from one of the source types.

In some embodiments the audio codec 203 can be configured to consecutively group the channels according to type of source. Thus for example in some embodiments using the example source types described herein the audio codec 203 is configured to generate a master signal comprising the X microphone channels represented by the channels 1:X, the Y accelerometer channels represented by the channels X+1:X+Y, and the Z piezo-electric transducer channels represented by the channels X+Y+1:X+Y+Z.

However it would be understood that in some embodiments the audio codec is configured to arrange the channels in a perceived or determined order. For example the audio codec 203 can in some embodiments be configured to generate a master signal comprising channels which are grouped according to their location within the apparatus or device. In other words the audio codec is configured to generate a master signal where the 'left' audio and tactile signals are grouped together and the 'right' audio and tactile signals are grouped together. In such embodiments the types of channels or signals can be effectively interleaved.

It would be understood that the audio codec can be configured to generate a master signal encoding can be any suitable encoding and that in some embodiments groups of channels such as the audio channels are encoded together (such that the accelerometer signals or channels are encoded together but separately from the piezoelectric transducer channels, which in turn are encoded together but separately from the audio channels which are encoded together and separately from the accelerometer signals or channels). Furthermore in some embodiments the correlation between the types of signals can be exploited to generate compact and data efficient representations of combination of types of signals.

The operation of encoding the signals as separate channels (within a single master or meta-signal) is shown in FIG. 4 by step 309.

The audio codec can then be configured to output the encoded signal da a o an application engine 205.

In some embodiments the apparatus comprises an application engine 205 configured to receive the encoded signals and process the signals according to any suitable method. In some embodiments the application engine for example can be configured to transfer or pass the signals to a storage or memory 16.

The operation of storing the signals is shown in FIG. 4 by step 311.

Thus in some embodiments an apparatus comprising a vibrometer (accelerometer) and a microphone, or multiple of those can be used to synchronously capture both a vibration and audio portion of the physical event.

In such a way the implementation of embodiments permits the apparatus to be located on a surface, for example a table surface (and therefore the accelerometer is connected or coupled to table surface and a microphone located next to it). In some embodiments the sensors are separate but connect or are coupled to the apparatus. Thus any event on the surface can be recorded both in terms of vibration and audio signals. These sensors can also be within the apparatus or device, such as a mobile phone. Thus such a device can capture any event on its surface or on table surface when placed on it (due to mechanical vibration coupling).

In some embodiments a bi-directional tactile devices, such as tactile audio display components as described above, could be used to record the vibration portion. In some embodiments the audio and mechanical recording is generated by microphones and accelerometer only.

Figure 6:
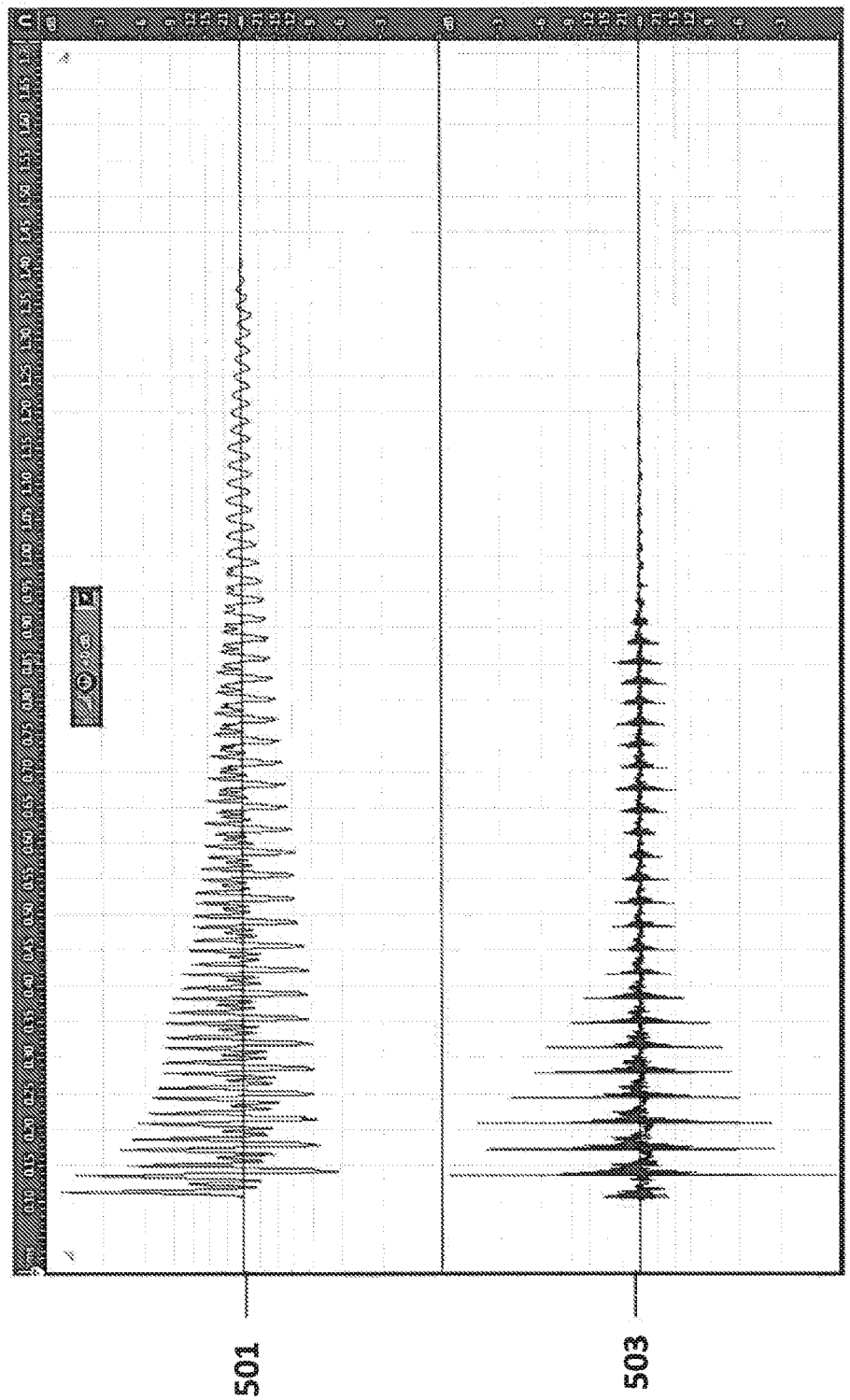
FIG. 6 show example mechanical and audio waveforms.

It would be understood to be beneficial to keep acoustic and vibration portions of the signals separated as they often have quite different signals from each other on the same frequencies. (It is the difference between acoustically and mechanically coupled audio signals. For example, such as shown in FIG. 6 where slapping a ruler against a table edge causes its distinctive audible buzzing from the highly asymmetrically clipped decaying sinewave 501. However the mechanically coupled portion 503 of the same sinewave is much more symmetrical. Where these signals are combined into a single signal then one or the other or both types of signal when recreated would feel or sound unnatural)

Figure 7:
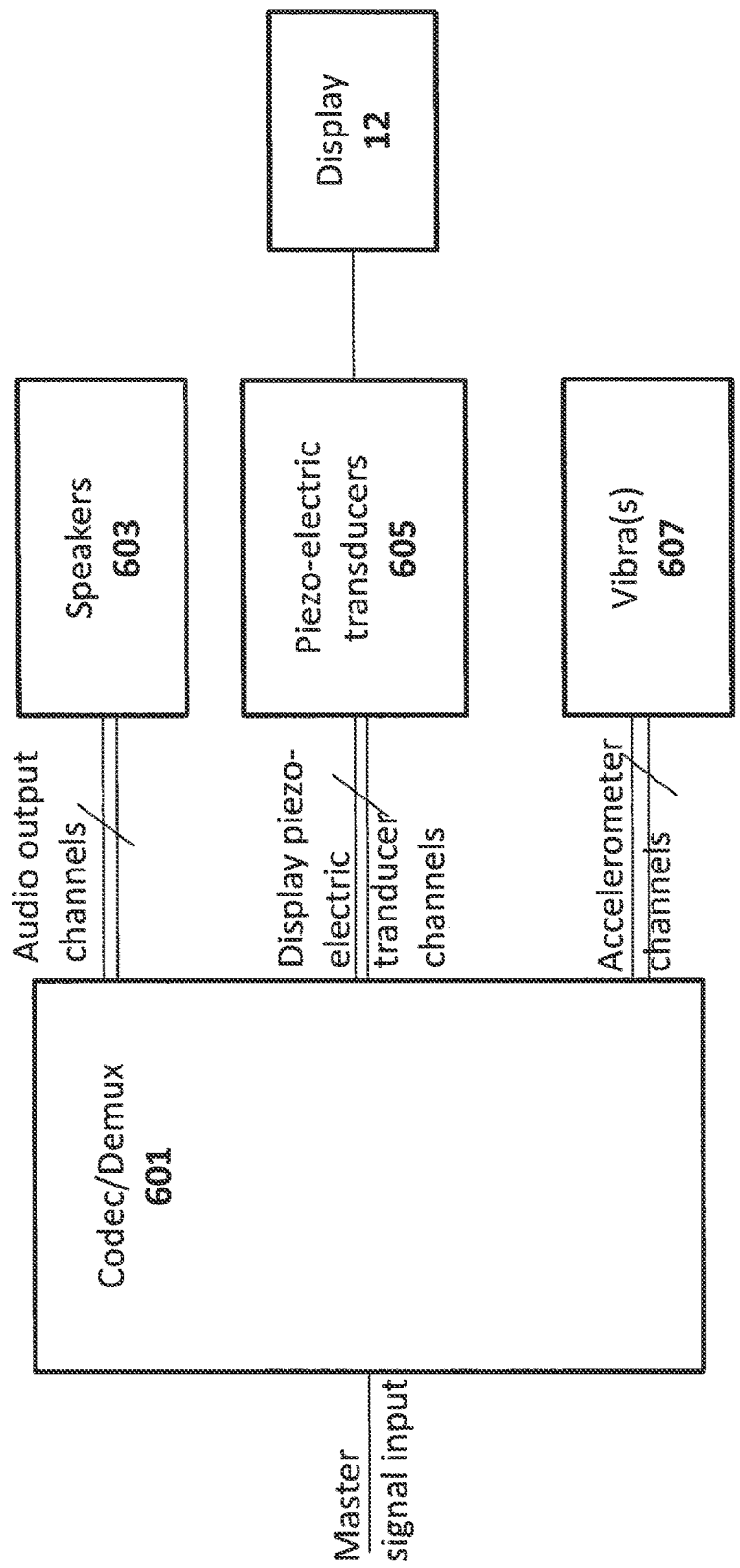
FIG. 7 shows example decoding or decoder aspects according to some embodiments.

With respect to FIG. 7 an example of the decoding or decoder aspect of some embodiments is described herein. For example FIG. 7 shows an example tactile effect playback apparatus with respect to some embodiments. Furthermore with respect to FIG. 8 a flow diagram showing example operations of the tactile effect playback apparatus as shown in FIG. 7 is shown in further detail.

In some embodiments the apparatus comprises a codec/demultiplexer 601. The codec/demultiplexer 601 is configured to receive the master signal input. The master signal input can for example be received from a memory or via a transceiver or any suitable receiving means.

Figure 8:
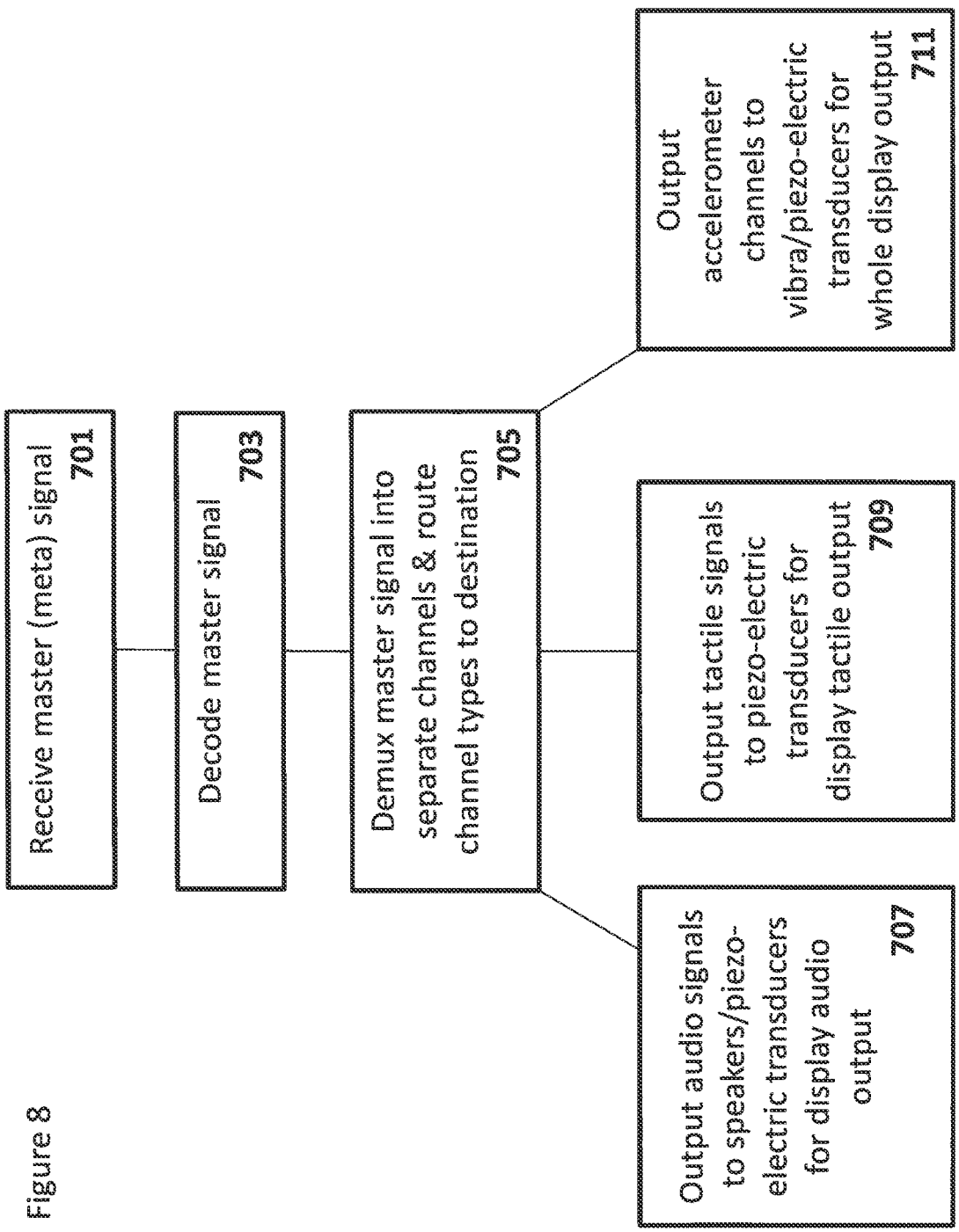
FIG. 8 is a flow diagram showing example operations of the tactile effect playback apparatus according to some embodiments.

The operation of receiving the master or meta signal is shown in FIG. 8 by step 701.

In some embodiments the codec/demultiplexer 601 is configured to decode the master signal. The decoder aspect of the codec can in some embodiments attempt to perform the inverse operation of the coder aspect of the audio codec 201.

The operation of decoding the master signal is shown in FIG. 8 by step 703.

In some embodiments the codec/demutimplexer 601 is further configured to demultiplex the decoded master signal into separate channels and further to route the channel types to a destination or suitable output.

Thus as shown in FIG. 7 the audio output channels are output to a speaker or speakers 603, the piezoelectric tactile effect channels are output to the piezoelectric transducers 605 and the accelerometer channels are output to a vibra 607.

The demultiplexing can be performed according to any suitable method. For example in some embodiments the channel ordering is determined or fixed and therefore the codecldemultiplexer 601 is configured to demultiplex the channels without any further information. However in some embodiments the channel ordering is flexible and the audio codec can be configured to generate a listing of the channel numbering such that the demultiplexer can demultiplex the channels according to the listing.

In the example shown in FIG. 7 the audio output channels, and accelerometer channels are output to speakers and vibras respectively however it would be understood that in some embodiments the audio output can be passed to the piezoelectric transducers for generating audio signals and similarly the accelerometer or vibration channels can be output to the piezoelectric transducers also to generate a suitable whole display output.

The operation of demultiplexing the master signal into separate channels and routing of the channel types to a destination is shown in FIG. 8 by step 705.

In some embodiments the apparatus comprises speakers 603. The speakers 603 can generate acoustic waves from the audio signals output from the codec/demultiplexer 601. It would be understood that in some embodiments the speakers 603 can represent headphones, a headset or any suitable other audio transducer. For example in some embodiments the audio signal is output to at least one piezoelectric transducer actuating the display 12 and configured to generate a display audio output.

The operation of outputting the audio signals to speakers/piezoelectric transducers for display audio output is shown in FIG. 8 by step 707.

In some embodiments the apparatus comprises at least one piezoelectric transducer 605 configured to receive the display piezoelectric transducer channels (or tactile effect channels). The at least one piezoelectric transducer 605 can then be configured to actuate the display 12 to generate suitable tactile effect outputs.

The operation of outputting tactile signals to the piezoelectric transducers for displaying tactile effect outputs is shown in FIG. 8 by step 709.

In some embodiments the apparatus comprises at least one vibra configured to receive the accelerometer channel outputs and configured to vibrate the whole device or apparatus. In some embodiments the accelerometer channels can be routed to the at least one piezoelectric transducer 605 to generate a whole display output. In other words to attempt to vibrate the whole of the device or apparatus to mimic the vibration of the recording device or apparatus.

The operation of outputting the accelerometer channels to the vibra/piezo electric transducers for whole display output is shown in FIG. 8 by step 711.

Figure 5:
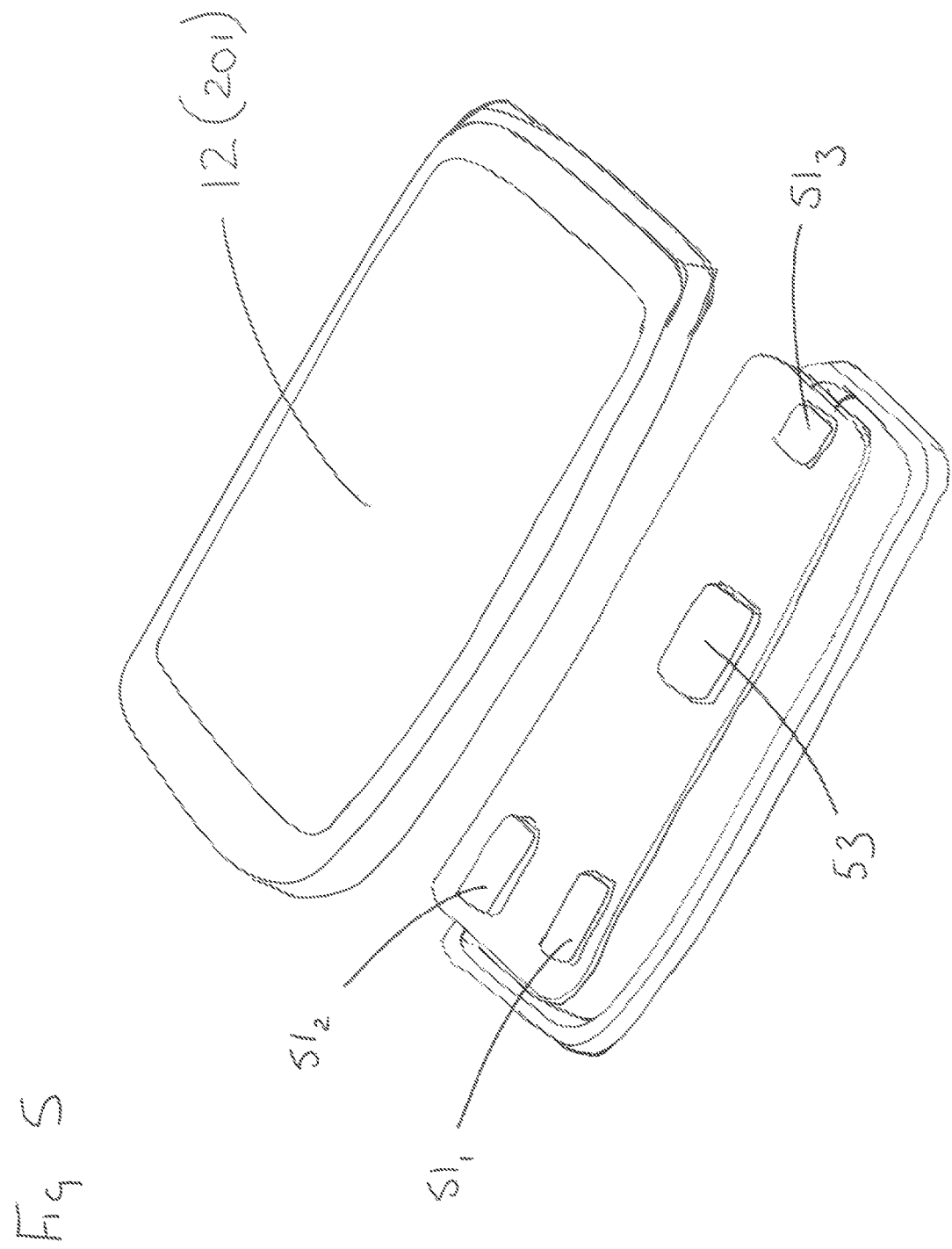
FIG. 5 shows schematically an example mobile apparatus suitable for employing the apparatus as shown in FIG. 3.

With respect to FIG. 5 a schematic exploded view of an apparatus is shown wherein there is shown 3 microphones $51_1$, $51_2$, $51_3$, an accelerometer 53, and display 12 (TAD-assembly) incorporating a piezoelectric transducer 201.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
  (a) hardware-only circuit implementations (such as implementations in only analogy and/or digital circuitry) and
  (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
  (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
receiving, at an electronic device, at a first input at least one first sensor signal from a first type of sensor, wherein the first type of sensor is outputting the at least one first sensor signal during capturing a physical event, the at least one first sensor signal having a first modality comprising an audio portion of the physical event having a first frequency response;
receiving, at the electronic device, at a second sensor input from a second type of sensor at least one second sensor signal, wherein the second type of sensor is outputting the at least one second sensor signal during capturing the physical event, the at least one second sensor signal having a second modality comprising a vibration portion of the physical event having a second frequency response wherein the second frequency response is different than the first frequency response; and
generating, at the electronic device, at least one meta signal comprising the at least one first sensor signal and the at least one second sensor signal, comprising providing the audio portion and the vibration portion of the physical event in the at least one meta signal as a plurality of channels based on the first type of sensor and the second type of sensor of the electronic device so as to reproduce the audio portion and the vibration portion of the physical event synchronously.

2. The method as claimed in claim 1, wherein the plurality of channels being assigned such that at least one channel comprises the at least one first sensor signal and at least one different channel comprises the at least one second sensor signal.

3. The method as claimed in claim 1, further comprising at least one of:
storing the at least one meta signal in a memory; and
transmitting the at least one meta signal to at least one apparatus separate from the electronic device.

4. The method as claimed in claim 1, further comprising:
processing the at least one first sensor signal and the at least one second sensor signal prior to generating the at least one meta signal such that each of the at processed least one first sensor signal and the at least one second sensor signal comprises a respective range of values for each of the at least one first sensor signal and the at least one second sensor signal that is suitable for the generating of the at least one meta signal.

5. The method as claimed in claim 4, wherein processing the at least one first sensor signal and the at least one second sensor signal comprises equalizing one of the at least one first sensor signal and the at least one second sensor signal based on a another one of the at least one first sensor signal and the at least one second sensor signal to compensate for at least one of a first and second sensor type response, surrounding acoustics, or a vibration path of the electronic device.

6. The method as claimed in claim 1, further comprising:
receiving at least one further sensor signal, the at least one further sensor signal having a modality different from the at least one first sensor signal and the at least one second sensor signal; and
wherein generating the at least one meta signal comprising the at least one first sensor signal and the at least one second sensor signal comprises generating the at least one meta signal comprising the at least one first sensor signal, the at least one second sensor signal and the at least one further sensor signal.

7. The method as claimed in claim 1, wherein the audio portion comprises at least one audio signal, and receiving the at least one first sensor signal comprises receiving the at least one audio signal from at least one of: at least one microphone of the electronic device, at least one memory of the electronic device, and at least one microphone that is separate from the electronic device.

8. The method as claimed in claim 1, wherein at least one of the at least one first sensor signal and the at least one second sensor signal is received based on receiving at least one touch sensor signal, and wherein receiving the at least one touch sensor signal is from at least one of:
at least one touch sensor associated with a display of the electronic device, at least one memory of the electronic device, and at least one touch sensor that is separate from the electronic device.

9. The method as claimed in claim 1, wherein at least one of the at least one first sensor signal and the at least one second sensor signal comprises at least one accelerometer signal, and receiving the at least one of the at least one first sensor signal and the at least one second sensor signal comprises receiving the at least one accelerometer signal from at least one of;
at least one accelerometer associated with the electronic device, at least one memory of the electronic device, and at least one accelerometer that is separate from the electronic device.

10. The method as claimed in claim 1, wherein there is:
wherein the first type of sensor has a first directional sensitivity to an input and the second type of sensor has a second different directional sensitivity to the input.

11. The method as claimed in claim 1, further comprising:
storing the at least one meta signal, the at least one first sensor signal and the at least one second sensor signal with separate resources, wherein the separate resources are at least one of channels; frequency; and time periods.

12. The method as claimed in claim 1, wherein generating the at least one meta signal comprises the plurality of channels are grouped according to a location of their origin at the electronic device.

13. A method comprising:
receiving, at an apparatus, at least one meta signal, comprising:
at least one first sensor signal from a first type of sensor output during capturing a physical event, the at least one first sensor signal having a first modality comprising an audio portion of the physical event having a first frequency response; and
at least one second sensor signal from a second type of sensor, wherein the at least one second sensor signal is received during capturing the physical event, the at least one second sensor signal having a second modality comprising a vibration portion of the physical event having a second frequency response wherein the second frequency response is different than the first frequency response,
wherein the audio portion and the vibration portion of the physical event are provided in the at least one meta signal as a plurality of channels based on the first type of sensor and the second type of sensor so as to reproduce the audio portion and the vibration portion of the physical event synchronously; and
wherein the at least one first sensor signal and the at least one second sensor signal are stored within the at least one meta signal; and separating, at the apparatus, the at least one meta signal to generate the at least one first sensor signal and the at least one second sensor signal.

14. The method as claimed in claim 13, wherein receiving the at least one meta signal comprises at least one of: receiving the at least one meta signal from a memory of the apparatus; and receiving the at least one meta signal from another apparatus separate from the apparatus.

15. The method as claimed in claim 13, wherein the audio portion comprises at least one audio signal, the method further comprising:
outputting the at least one audio signal to at least one of at least one audio transducer of the apparatus, at least one memory of the apparatus, and at least one other apparatus that is separate from the apparatus.

16. The method as claimed in claim 13, wherein at least one of the at least one first sensor signal and the at least one second sensor signal is received based on receiving at least one touch sensor signal,
wherein receiving the at least one touch sensor signal is from at least one of: at least one tactile effect transducer associated with a display of the apparatus, at least one memory of the apparatus, and another apparatus that is separate from the apparatus.

17. The method as claimed in claim 13, wherein at least one of the at least one first sensor signal and the at least one second sensor signal comprises at least one accelerometer signal from at least one accelerometer, and the method further comprises: outputting the at least one accelerometer signal from the at least one accelerometer to at least one other apparatus that is separate from the apparatus.

18. The method as claimed in claim 13, further comprising:
separating the at least one meta signal using separate resources to generate the at least one first sensor signal and the at least one second sensor signal, wherein the separate resources are at least one of: channels; frequency; and time periods.

19. The method as claimed in claim 13, wherein the first sensor has a first directional sensitivity to an input and the second type of sensor has a second different directional sensitivity to the input.

20. An apparatus comprising:
at least one processor and
at least one memory including computer code for one or more programs, the at least one memory and the computer code configured to with the at least one processor cause the apparatus to at least:
receive at a first input at least one first sensor signal from a first type of sensor, wherein the first type of sensor is outputting the at least one first sensor signal during capturing a physical event, the at least one first sensor signal having a first modality comprising an audio portion of the physical event having a first frequency response;
receive at a second input at least one second sensor signal from a second type of sensor, wherein the second type of sensor is outputting the at least one second sensor signal during capturing the physical event, the at least one second sensor signal having a second modality comprising a vibration portion of the physical event having a second frequency response wherein the second frequency response is different than the first frequency response; and
generate at least one meta signal comprising the at least one first sensor signal and the at least one second sensor signal, comprising providing the audio portion and the vibration portion of the physical event in the at least one meta signal as a plurality of channels based on the first type of sensor and the second type of sensor so as to reproduce the audio portion and the vibration portion of the physical event synchronously.

21. An apparatus comprising:
at least one processor and at least one memory including computer code for one or more programs, the at least one memory and the computer code configured to with the at least one processor cause the apparatus to at least:
receive at least one meta signal, comprising:
at least one first sensor signal from a first type of sensor, wherein the first type of sensor is outputting the at least one first sensor signal during capturing a physical event, the at least one first sensor signal having a first modality comprising an audio portion of the physical event having a first frequency response, and
at least one second sensor signal from a second type of sensor, wherein the at least one second sensor signal is received during capturing the physical event, the at least one second sensor signal having a second modality comprising a vibration portion of the physical event having a second frequency response wherein the second frequency response is different than the first frequency response,
wherein the audio portion and the vibration portion, are provided in the at least one meta signal as a plurality of channels based on the first type of sensor and the second type of sensor so as to reproduce the audio portion and the vibration portion of the physical event synchronously; and
wherein the at least one first sensor signal and the at least one second sensor signal are stored within the at least one meta signal using separate resources; and
separate the at least one meta signal to generate the at least one first sensor signal and the at least one second sensor signal.

* * * * *

UNITED STATES PATENT AND TRADEMARK OFFICE
CERTIFICATE OF CORRECTION

PATENT NO. : 10,248,205 B2
APPLICATION NO. : 14/780675
DATED : April 2, 2019
INVENTOR(S) : Panu Petri Brodkin It is certified that error appears in the above-identified patent and that said Letters Patent is hereby corrected as shown below:

In the Claims

In Claim 1:
Column 19, Line 10, "second-sensor" should be deleted and --second-- should be inserted.

In Claim 4:
Column 19, Line 42, "at processed" should be deleted and --processed at-- should be inserted.

In Claim 10:
Column 20, Line 28, "wherein there is" should be deleted.

In Claim 19:
Column 21, Line 40, "first" should be deleted and --first type of-- should be inserted.

Signed and Sealed this
Seventh Day of May, 2019

Andrei Iancu
*Director of the United States Patent and Trademark Office*